United States Patent [19]

Peterson

[11] Patent Number: 4,720,190

[45] Date of Patent: Jan. 19, 1988

[54] LAMP ANALYZER

[75] Inventor: Jack E. Peterson, Chino, Calif.

[73] Assignee: Dupree, Inc., Chino, Calif.

[21] Appl. No.: 804,882

[22] Filed: Dec. 5, 1985

[51] Int. Cl.$^4$ .............................. G01J 5/30; G01J 5/60
[52] U.S. Cl. ....................................... 356/45; 356/236; 374/127
[58] Field of Search .................... 356/45, 236, 425; 374/126, 127

[56] References Cited

U.S. PATENT DOCUMENTS

| | | | |
|---|---|---|---|
| 3,672,217 | 6/1972 | Naya et al. ............................ | 356/45 |
| 3,759,102 | 9/1973 | Murray ................................. | 374/127 |
| 3,795,918 | 3/1974 | Sunderland .......................... | 356/45 |
| 3,944,819 | 3/1976 | Sherwood ............................ | 356/425 |
| 4,158,505 | 6/1979 | Mathisen et al. .................... | 356/325 |
| 4,410,266 | 10/1983 | Seider ................................... | 356/45 |
| 4,470,710 | 9/1984 | Crane et al. .......................... | 374/127 |
| 4,561,786 | 12/1985 | Anderson ............................. | 374/127 |

Primary Examiner—R. A. Rosenberger
Attorney, Agent, or Firm—Harris, Kern, Wallen & Tinsley

[57] ABSTRACT

A method and apparatus for calculating the equivalent blackbody color temperature of incandescent lamps. A lamp analyzer having photosensors which detect the red and blue components of lamp radiation and convert the components to analog currents. The currents pass through a multiplex system and are converted into a signal with voltages proportional to the photosensor currents. A signal conditioner circuit removes switching transients, damped oscillations and cell noise from the circuit, and an automatic gain controller system insures linearity in the signal. The ratio of the blue component of the signal to the red component is then determined by a ratio computer, producing an output which is linearized and scaled by a translator to display the corresponding color temperature of the lamp in Kelvins.

11 Claims, 9 Drawing Figures

FIG. 6A. SIGNAL CONDITIONER INPUT

FIG. 6B. SIGNAL CONDITIONER DRIVING KEY

FIG. 6C. SIGNAL CONDITIONER OUTPUT

FIG. 7.

LAMP ANALYZER

BACKGROUND OF THE INVENTION

This invention relates to a method and apparatus for determining the equivalent blackbody color temperature of incandescent lamps. In many applications of incandescent lamps, possession of measured values of filament color temperature would be a valuable design aid through reducing time investment and improving accuracy in the meeting of design requirements.

For example, to design a lighting system in which lamp output is to be "whitened" by blue filtration to meet a given chromaticity specification requires that filament color temperatures be accurately known, unless a cut-and-try approach is used. This is true because relatively small variations in filament color temperature result in widely divergent resultant chromaticity of the filtered light, and because there are no consistent correlations between color temperature and other lamp parameters, such as average luminous intensity or filament power.

An accurate straight-forward lighting system design approach would consist of the following steps: (1) measure the color temperatures of a statistically significant number of lamps of the selected type to obtain a distribution curve and a color temperature norm; (2) design a filter to achieve the desired chromaticity coordinates with maximum lamp utilization; and (3) select lamps for use in production by measurement of color temperature and application of tolerance limits based on filter and lamp characteristics and the margin of error allowed for the chromaticity of the filtered light. The apparatus and method of the present invention may be used in carrying out steps (1) and (3).

To accurately specify the chromaticity of an unknown light source, the relative power levels corresponding to each of three standard Commission Internationale de l'Eclairage (CIE) primary color components (red, green and blue) must be determined by some means of spectral analysis.

If a source has a known distribution of radiant exitance relative to wavelength, it may be possible to simplify the color specification to a single-valued parameter.

This is commonly done with blackbody radiators, because the radiant exitance as a function of the absolute (Kelvin) temperature of the radiator is known through Planck's equation, which is $$M\lambda = C_1 \lambda^{-5} (e^{C_2/\lambda T} - 1)^{-1},$$

Where: $M\lambda$ is the total spectral radiant exitance in watts per square centimeter of emitting surface area per micron bandwidth at wavelength $\lambda$ in microns (dimensionally, energy per unit time per unit length cubed); $\lambda$ is the wavelength in microns; T is the absolute temperature of the blackbody radiator in Kelvins, e is the base of the Napierian system of logarithms (2.7182—); $C_1$ is a constant (3.7418— $\times 10^{-12}$ watt-cm$^2$); and $C_2$ is a constant (1.4388— $\times 10^4$ micron-Kelvins).

Any given blackbody temperature of sufficient magnitude to generate visible light would correlate to a particular unique set of tristimulus color coordinates. The absolute temperature of a blackbody radiator, then, may be used in lieu of the corresponding tristimulus color coordinates to specify the chromaticity of its radiated light.

The overall spectral distribution of power radiated from an incandescent lamp differs considerably from that of a true blackbody. For this reason, the lamp is called a "selective radiator."

In the visible part of the spectrum, however, the incandescent lamp power distribution curve almost tracks that of the blackbody, but at a lower per-unit-area radiated power level. If only visible radiation is of concern, the lamp comes very close to qualifying as a "graybody," because Planck's equation may be applied through use of an appropriate efficiency factor which is nearly constant as a function of wavelength throughout the visible spectrum.

At a particular filament temperature, the shape of the spectral power distribution curve of the lamp will be practically identical to that of a blackbody operating at some higher temperature. Regardless of power levels, a match of distribution shapes implies a match in chromaticity.

The color temperature of an incandescent lamp is the absolute temperature of a true blackbody that causes the blackbody to generate a spectral distribution of radiant power that is the closest possible match to that of the incandescent lamp.

Color temperature is universally used as a means of specifying the chromaticity of incandescent lamps and is expressed as equivalent absolute temperature in Kelvins.

A comparison of the standard (CIE) tristimulus chromaticity values for a black body radiator over the range of 1600 K. to 3200 K. (the practical range for incandescent lamps) shows that relative to red, the green component changes very little whereas the blue component undergoes a drastic change, steeply increasing as the temperature rises. Table 1 is a tabulation of the tristimulus values, based on a chromaticity analysis of Plank's equation for several values of absolute temperature, wherein x, y and z represent, respectively, the red, green and blue components of chromaticity values expressed as normalized or fractional parts of the total radiated power at each tabulated temperature (sum of x, y, and z equals unity to three decimal places for each temperature).

TABLE 1

Spectral Analysis of Blackbody Radiator
CIE Chromaticity Functions Applied To Plank's equation

| T (K) | x (Red) | y (Green) | z (Blue) | Ratio z/x |
|---|---|---|---|---|
| 1600 | .573 | .399 | .027 | .047 |
| 1800 | .549 | .408 | .042 | .077 |
| 2000 | .527 | .413 | .060 | .114 |
| 2200 | .506 | .415 | .079 | .156 |
| 2400 | .486 | .415 | .099 | .204 |
| 2600 | .468 | .412 | .119 | .254 |
| 2800 | .452 | .409 | .139 | .308 |
| 3000 | .437 | .404 | .159 | .364 |
| 3200 | .423 | .399 | .178 | .421 |

Table 1 includes a ratio column which shows that each temperature value has a corresponding unique ratio of blue-to-red components which is independent of the level of the total power radiated by the source.

Figure 1:
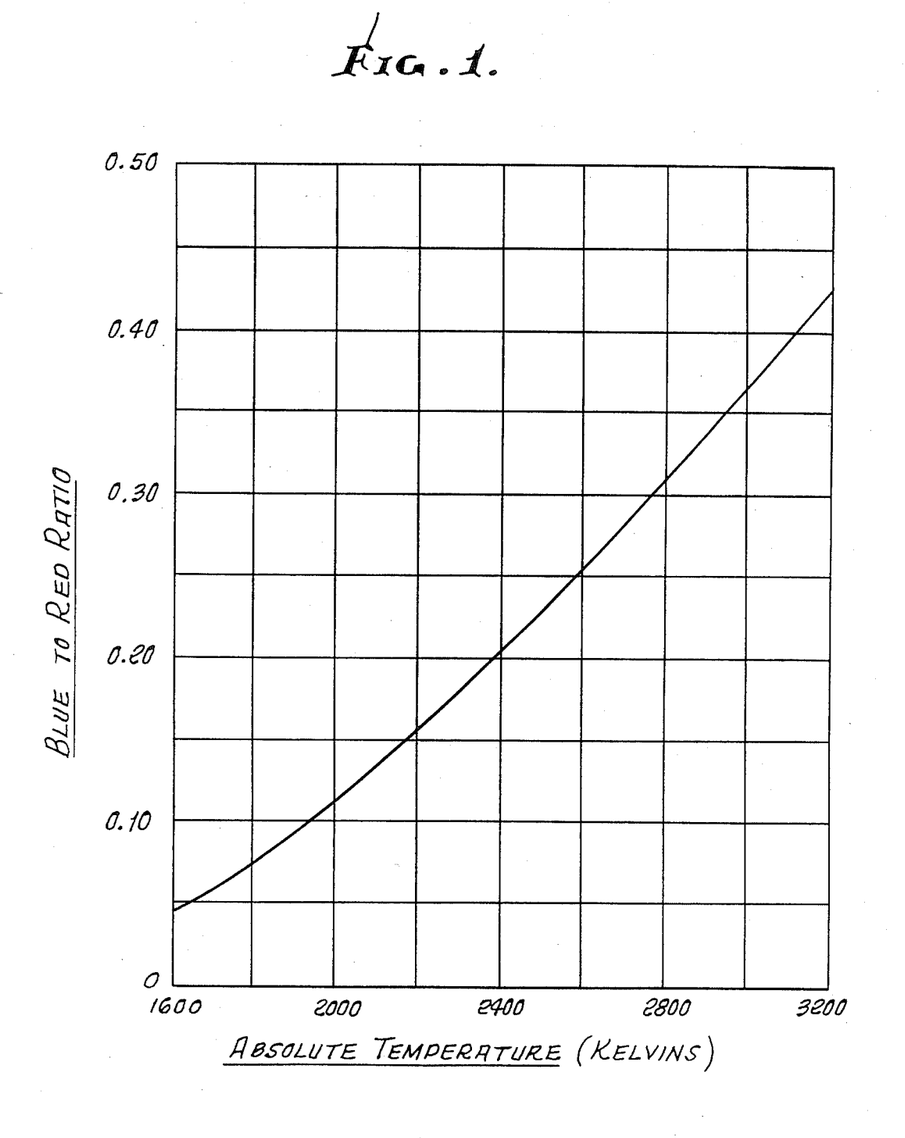
FIG. 1 is a graphic plot of the ratio of the blue component of blackbody radiation to the red component as a function of absolute temperature for a theoretical ideal blackbody radiator using a set of filters matching the CIE blue and red filter functions.

FIG. 1 is a plot of the blue-to-red ratio as a function of temperature, using values taken from Table 1.

The functional relationship between the blue-to-red ratio and color temperature can be used to form the operational basis for a simple bi-color instrument to be used for measurement of the color temperature of incandescent lamps.

The blue and red filter bands need not be those as defined for the CIE tristimulus specification of color. The bands may be selected to obtain the best compromise among such characteristics as ratio curve slope and linearity and signal-to-noise ratio.

To form a complete instrumentation system, the computed blue-red ratio signal may be coupled into a calibration "translator" circuit capable of linearizing the input and setting slope and offset values so as to drive a digital display to deliver direct read-out of the color temperature in Kelvins.

Such a system can be calibrated through use of lamp standards that may be obtained from the National Bureau of Standards (NBS). These lamps have color temperature specified as a function of filament current for several points. In addition, and conversely, NBS will provide a polynomial equation having computer-derived coefficients which allows computation of filament current for any specified color temperature over a wide range of practical values.

It is an object of the present invention to provide a high-reliability, all solid-state electronic measurement system, wherein motor-driven filter wheels and servo-controlled shutters are not used.

It is another object of the invention to provide a lamp analyzer requiring infrequent calibration, which is uneffected by ambient temperature changes typical of a laboratory environment, and which is completely automated, eliminating the need for manual gain adjustment, nulling procedures or meter zeroing.

It is a further object of this invention to provide a lamp analyzer which has a minimum luminous intensity dynamic range of 2000 to 1, with sufficient sensitivity to allow accurate color temperature measurement at average luminous intensities of about 10 mcd (millicandelas) or less and having a color temperature range of 1600 to 3200 Kelvins.

It is yet another object of this invention to provide a lamp analyzer having an error detector providing for display shut-down to prevent erroneous temperature read-out if the luminous intensity or color temperature of the lamp is below the threshold of accurate signal processing.

It is a further object of this invention to provide a lamp analyzer having a simple and straightforward calibration procedure with all adjustments being independent and non-iterative.

It is still another object of this invention to provide a lamp analyzer having a direct color temperature read-out in Kelvins on a digital display having a resolution of four digits, wherein the color temperature error is small compared to the estimated tolerance of the NBS calibration standard over the full range of the analyzer.

It is a further object of this invention to provide a lamp analyzer wherein the light radiated from the lamp is integrated before subjection to ratio analysis in order to average the effects of filament temperature gradient.

It is yet another object of this invention to provide a lamp analyzer with blue and red channel electrical inputs which are derived from the same or identical radiated light samples.

It is still another object of this invention to provide a lamp analyzer wherein the blue and red channels have virtual linearity over the full dynamic range of the instrument, and which have electrical gain values that are independent of ambient temperature or that precisely track one another with changes in ambient temperature.

It is a further object of this invention to provide a lamp analyzer with a gain control system wherein the blue and red channels precisely track with one another over the range and sensitivity of the lamp.

Other objects, advantages, features and results will more fully appear in the course of the following description.

SUMMARY OF THE INVENTION

A method for lamp analysis providing an accurate digital read-out of the lamp color temperature. The lamp is placed in a light integrating sphere, which reflects the lamp radiation towards photosensors, which detect red and blue components of the lamp radiation. The photosensors produce corresponding "red" and "blue" currents, which are electrical analogs of the red and blue lamp radiation components. These currents are multiplexed by a multiplex system, along with a zero reference current obtained from a zero ground reference, and then are directed to a current-to-voltage converter which produces a tri-level signal with voltage levels related to the input red, blue and reference currents, respectively.

The signal is then analyzed by a blue-red ratio computer, which produces an output representing the ratio of the "blue" voltage in the signal to the "red" voltage.

The ratio signal is then processed by a ratio-to-color-temperature translator.

Finally, a digital meter is used to display the color temperature of the lamp in Kelvins, said color temperature corresponding to the output of the translator. An error detector is preferably utilized to disable the meter display when the color temperature or luminous intensity of the lamp is outside the range of accurate measurement.

The tri-level signal produced by the current-to-voltage converter is preferably processed by a signal conditioner, which removes switching transients, damped oscillations and cell noise introduced at the photosensor or during the multiplexing operation. The conditioned signal then preferably passes through a coupling network, which prevents the passage of any accumulated dc offset voltage which may have developed during current-to-voltage conversion or signal conditioning.

The signal is preferably processed through an automatic gain controller (AGC) system, which maintains high linearity in the signal over a wide range of lamp intensity.

The output of the blue-red ratio computer is preferably linearized and scaled by means of a translator before being displayed by the meter.

The invention also includes apparatus for performing these steps.

DESCRIPTION OF THE PREFERRED EMBODIMENT

Figure 2:
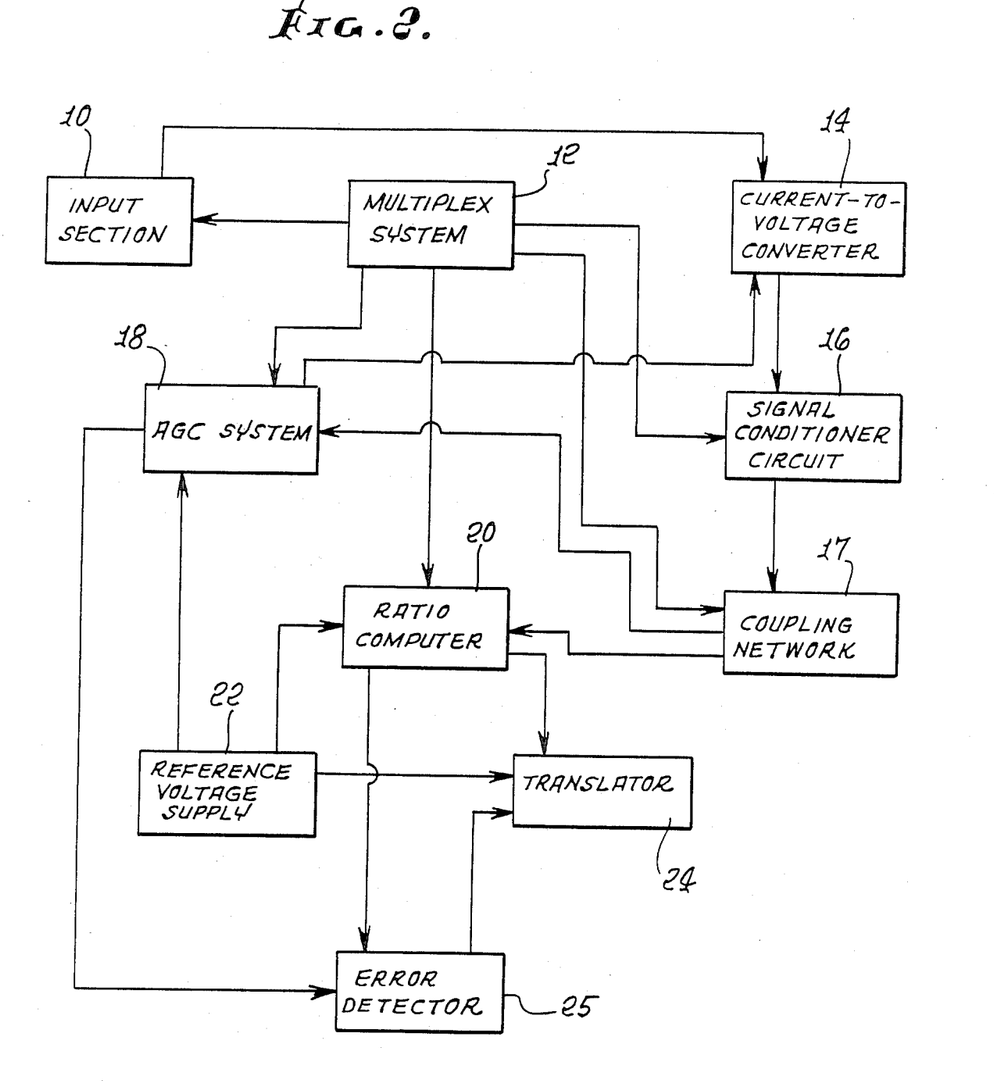
FIG. 2 is a block diagram of a lamp analyzer incorporating the presently preferred embodiment of the invention.

Referring to FIG. 2 of the drawings, the lamp analyzer of the present invention comprises an input section 10, a multiplex (MUX) system 12, a current-to-voltage converter 14, a signal conditioner circuit 16, a coupling network 17, an automatic gain controller (AGC) system 18, a blue-red ratio computer 20, a reference voltage supply 22, a translator 24, and an error detector 25. The description that follows is keyed primarily to FIG. 3.

Figure 3:
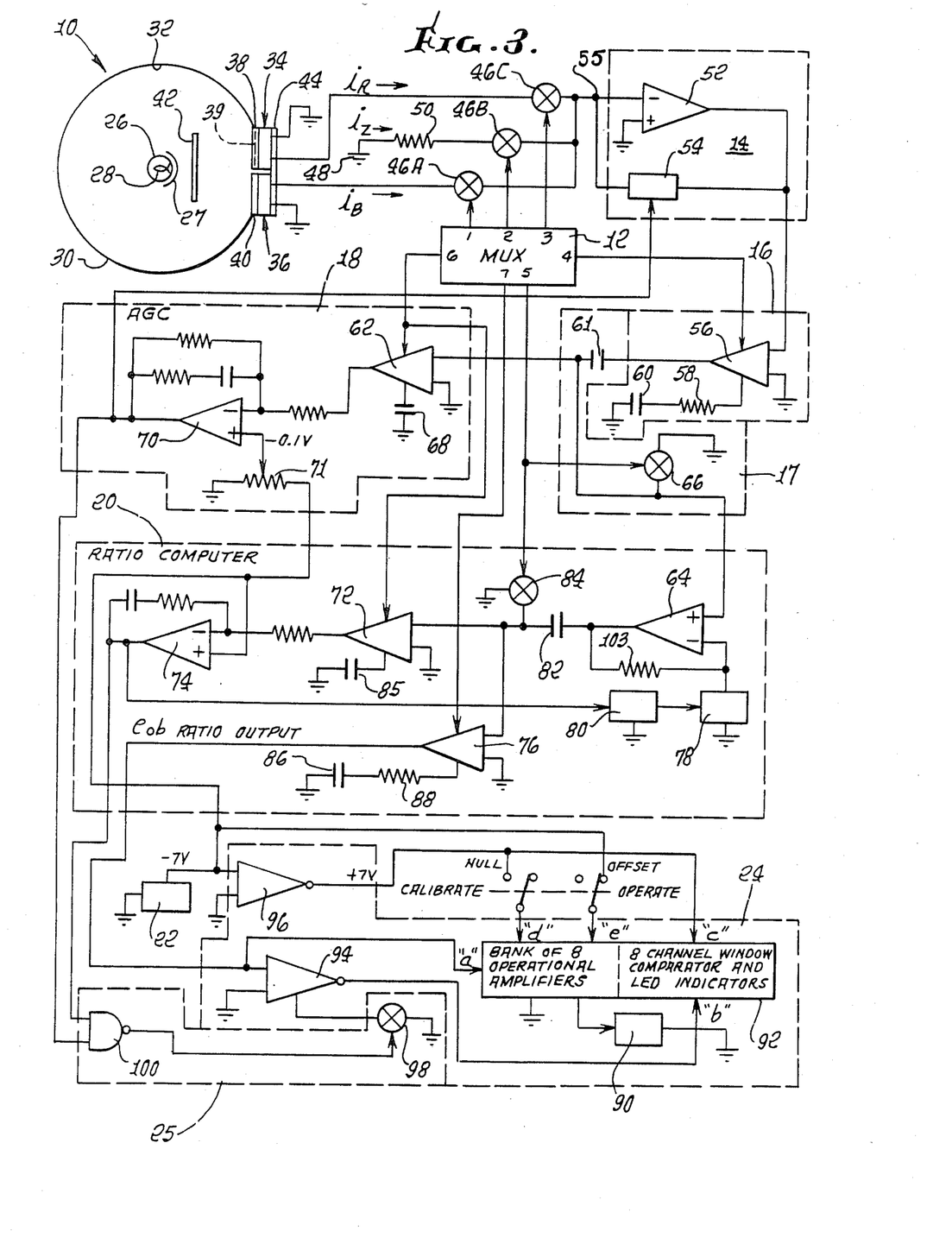
FIG. 3 is an electrical schematic of the instrument of FIG. 2.

The input section 10 includes a lamp holder 27 in which a lamp 26, with an incandescent filament 28, may be mounted; a light integrating photometric sphere 30 with a matte-white inner surface 32; a photosensor unit 34; a photosensor unit 36; a red optical band pass filter 38; a blue optical band pass filter 40; a baffle 42; a heat sink 444; electronic analog switches 46A–46C, respectively, which may be field effect transistors (hereinafter referred to as "FETS"); a zero ground reference 48; and a resistor 50.

The MUX system 12 includes output channels 1–7.

The current-to-voltage converter 14 includes an amplifier 52, which constitutes a pre-amplifier, and an opto-coupler 54, which constitutes a feedback resistor.

The signal conditioner circuit 16 includes a sample-and-hold (SH) device 56, a resistor 58, and a capacitor 60, which constitutes a memory capacitor for the signal conditioner circuit.

The coupling network 17 includes a capacitor 61 and a bilateral electronic analog switch 66.

The automatic gain controller (AGC) system 18 includes a SH device 62, a capacitor 68 which constitutes a memory capacitor, an amplifier 70 which constitutes an error amplifier, and a potentiometer 71.

The ratio computer 20 includes an amplifier 64; a SH device 72; an amplifier 74 constituting an error amplifier; a SH device 76; an opto-coupler 78; a transistor network 80; a capacitor 82; a bilateral electronic analog switch 84; a capacitor 85 constituting a memory capacitor; a capacitor 86 constituting a memory capacitor; and a resistor 88.

The translator 24 comprises a display means such as Kelvin digital panel meter 90, translating circuitry 92, an amplifier 94, and an amplifier 96 which constitutes a unity gain inverter.

The error detector 25 comprises an electronic analog switch 98, such as an FET, and a not-and ("NAND") gate 100.

Input Section

The test lamp 26 is energized through the lamp holder 27, which supports the lamp so as to position its filament approximately at the center of the light integration photometric sphere 30. The two photosensor units (or "photosensors") 34 and 36, which are preferably silicon photosensors and are mounted closely together and fitted, respectively, with the red and blue band pass filters 38 and 40, are illuminated with identical samples of radiation from the lamp 26, said radiation being integrated by multiple reflections from the high-reflectance matte-white inner surface 32 of the sphere 30. Direct non-integrated light is prevented from reaching the photosensors 34 and 36 by a baffle 42. The filters 38 and 40 are disposed between the sphere 30 and the photosensors 34 and 36, respectively, such that the light reaching photosensor 34 first passes through the red filter 38, and the light reaching photosensor 36 first passes through blue filter 40.

The photosensors 34 and 36 generate currents $i_R$ and $i_B$, respectively, which are electrical analogs of the red and blue components of the lamp radiation. The ratio of the electrical analogs is ideally dependent upon the spectral distribution of the filament radiation but independent of all other factors, such as environmentally-induced anomalies due, for instance, to variations in lamp brightness or ambient temperature.

The input section 10 of the system is the section most susceptible to environmentally-induced anomalies because it is here, prior to the multiplexing operation, that the blue and red signal components, i.e. the currents $i_R$ and $i_B$, exist as separate entities in discrete channels. To ensure that the ratio of the current $i_B$ to the current $i_R$ (the "blue-red ratio") is substantially independent of variations in luminous intensity, the photosensors 34 and 36, as will be shown, are operated essentially on short-circuit, with current values at maximum luminous intensity being well below approximately 1% of the saturation level. Silicon photosensor characteristics are such that, with these conditions satisfied, the currents $i_R$ and $i_B$ produced by photosensors 34 and 36 will each change substantially proportionally to the lamp luminous intensity and will therefore exhibit substantially no change in ratio as a result of changes in luminous intensity, providing the spectral distribution of the radiant energy remains fixed.

To assure that the ratio of blue-to-red is substantially unaffected by changes in ambient temperature, the following precautions are taken: (1) a degree of thermal isolation is provided between the photosensors 34 and 36 and the test lamp 26 through the use of a reasonably large photometric sphere 30 (such as at least approximately 8" diameter for measurement of miniature lamps); (2) materials are selected for the optical band pass filters 38 and 40 to have transmittance curves of very high temperature stability; (3) silicon chips for the photosensors units 34 and 36 are selected from the same silicon lot, and their dark cell resistances are matched to achieve substantially equal thermal coefficients of responsivity; and (4) photosensors 34 and 36 are in thermal communication with the common heat sink 44 to achieve close temperature tracking between the two units. Substantial linearity over a wide dynamic range is ensured in part by the use of silicon photosensors which are free from fatigue, memory and hysteresis effects.

The currents $i_B$ and $i_R$ and a zero reference current $i_Z$ (obtained from zero ground reference 48 through resistor 50) are sequentially gated through electronic switches 46A, 46B and 46C respectively to the input of amplifier 52, which constitutes a preamplifier.

Multiplex System

Figure 4:
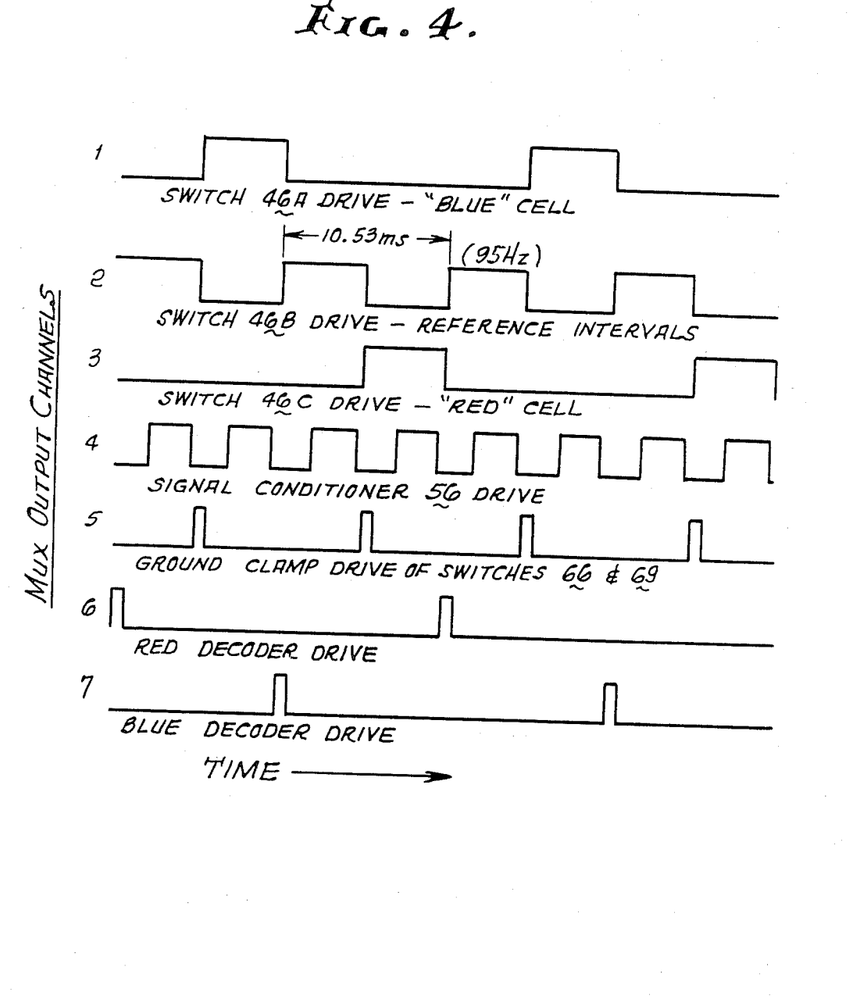
FIG. 4 is a timing diagram of the output channels of the multiplex system of the instrument of FIGS. 2 and 3.

A multiplexing (time-sharing) technique is used to direct signal transfer through the three switches 46A–46C. In addition, it will be shown that the multiplex system 12 controls signal conditioning, establishes ground reference levels at various points and directs signal transfer through the AGC system 18 and blue-red ratio computer 20. All of these functions are accomplished through seven synchronized control signal outputs generated by MUX 12 from a master clock, which is not shown but which is of standard clock design. The time relationships and durations of the control signals are shown in FIG. 4, which is a timing diagram of the seven MUX outputs, wherein the high waveform levels indicate enablement of the respective driven circuits.

The multiplexing design of the present invention has decided advantages over a dual-channel design. For example, if the signal amplifiers are designed to maintain high linearity, then gain variations produced by any factors, either deliberately or unavoidably environmentally induced, will affect the blue and red signals substantially equally, thus causing no change in the ratio of the two components. This allows automatic gain control to be applied to the multiplexed channel for enhancement of the dynamic range of the instrument, and eliminates any further need to achieve thermal tracking or gain tracking between circuits.

Another advantage of multiplexing accrues from the switching operation which, as will be shown, develops a tri-level ac signal from the three dc inputs. This signal may be capacitively coupled from stage to stage, thereby isolating thermally- or temporally-induced dc amplifier offsets. Capacitive coupling prevents amplification of accumulated dc offset voltages which may represent large errors, cause amplifier non-linearity or require frequent nulling, and precludes the need for amplifier offset nulling circuits.

Current-to-Voltage Converter

The electronic switches 46A, 46B and 46C, which are preferably field effect transistors (FETS) selected for very low ON resistance, are sequentially driven to conduction and cut-off by MUX output channels 1, 2, and 3 (see FIG. 4). This procedures serial input currents, namely current $i_B$ from photosensor 36, the zero reference current $i_Z$ through resistor 50, and current $i_R$ from photosensor 34. These currents are multiplexed to the amplifier 52 in the order $i_B$, $i_Z$, $i_R$, $i_Z$, $i_B$, $i_Z$, $i_R$, etc. That is, $i_B$ is the first input to the amplifier 52, and $i_Z$ is input to the amplifier 52 after each input of $i_R$ or $i_B$; $i_R$ is input to the amplifier 52 following input each of $i_Z$ which is preceded by $i_B$; and $i_B$ is input to the amplifier 52 following each input of $i_Z$ which is preceded by $i_R$. Amplifier 52 is an integrated circuit amplifier constituting a preamplifier, configured as a current-to-voltage converter; therefore, point 55 in the circuit is a virtual ground due to feedback nulling, and the currents $i_R$, $i_Z$ and $i_B$ input to amplifier 52 become short-circuit currents, which is a requirement for producing linear opto-electrical conversion.

The resistance of the resistor 50 and the dark-cell resistances of the photosensor units 34 and 36 (also referred to as "photocells" or "cells") are selected to closely match one another in order to maintain a constant dark-cell offset voltage at the output of amplifier 52 during all phases of the multiplex cycle. Because resistance matching causes the dark-cell gain of amplifier 52 to be substantially the same for each of the channels 1–3, substantially identical zero-signal output levels are established for all three channels 1–3. The accuracy with which the dark-cell resistances and the value of resistor 50 must be matched diminishes rapidly as the dark cell resistance values increase. Dark-cell resistances of at least approximately 10 megohms are desirable in order to relax the matching requirement to approximately 10% and to make offset nulling of amplifier 52 either unnecessary or non-critical. If unmatched low cell resistances were used, a stepped signal rather than a steady dc level would appear at the output of amplifier 42 under dark cell conditions, unless the amplifier 42 were very carefully nulled, and the system would be subject to becoming unbalanced with time and temperature changes.

Figure 5:
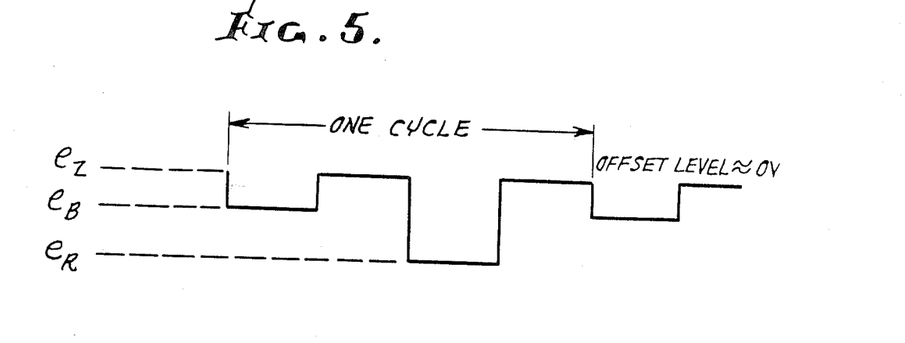
FIG. 5 shows an idealized output of the current-to-voltage converter of the instrument of FIGS. 2 and 3.

When the photosensors 34 and 36 are illuminated, the output of amplifier 52 becomes a tri-level series of voltage steps, with a full cycle consisting of four intervals due to the insertion of two reference levels (from the $i_Z$ current) per cycle. FIG. 5 illustrates the idealized output of amplifier 52, showing zero reference voltage $e_Z$ resulting from current $i_Z$, "blue" voltage $e_B$ resulting from current $i_B$, and "red" voltage $e_R$ resulting from current $i_R$. The offset level of the amplifier 52 is ideally zero volts.

The output steps have a negative polarity, as a result of the photosensors 34 and 36 being connected with grounded cases, to minimize extraneous pick-up and simplify the implementation of thermal tracking criteria, and because circuitry at a later point requires a negative input. The magnitude of each of the voltages $e_B$, $e_Z$ and $e_R$ substantially equals the product of the resistance of the feedback resistor 54 and the values of currents $i_B$, $i_Z$ and $i_R$, respectively, summed with any existing amplifier offset. Thus, the voltages $e_B$, $e_Z$ and $e_R$ are substantially proportional to the currents $i_B$, $i_Z$ and $i_R$, respectively. The stepped signal at the output of the amplifier 52 is regulated by the AGC system 18, which sets the resistance value of the resistor 54 by means of a dc control signal. Operation of the AGC system 18 is described in detail in a later paragraph.

Figures 6, 6A:
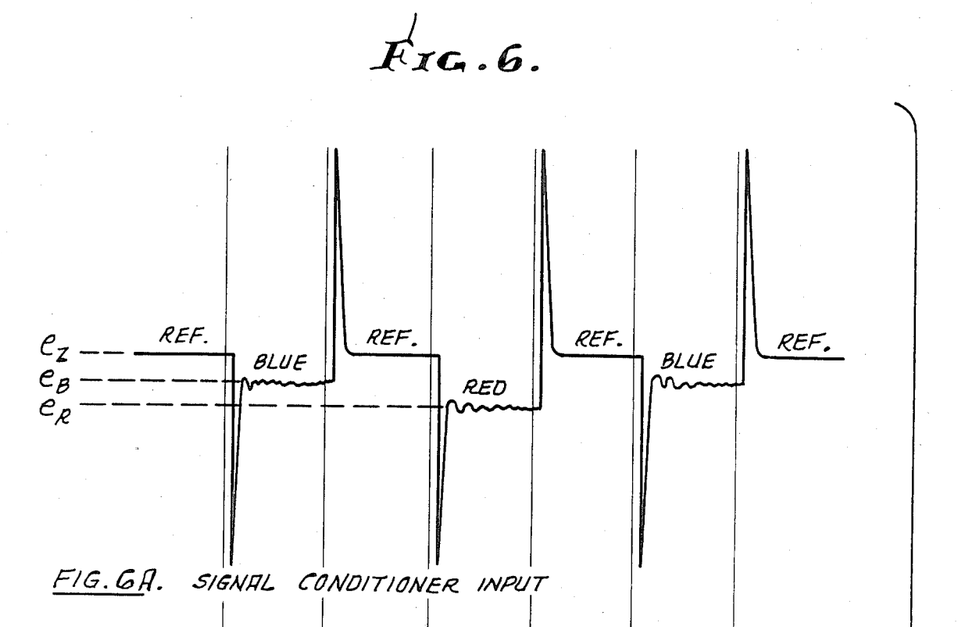
FIG. 6, consisting of FIGS. 6A–6C, is a diagram illustrating waveforms of the signal conditioner input, driving key and output.

At low light levels the resistance of resistor 54 is relatively high in value (approximately 10 megohms), thus establishing a high conversion gain for amplifier 52. In this situation, several signal anomalies become apparent, causing the signal waveform to deviate considerably from the ideal shown in FIG. 5. Switching transients, damped photosensor oscillations and amplified random photosensor noise all appear along with the desired tri-level signal components $e_Z$, $e_B$ and $e_R$ at the output of amplifier 52. FIG. 6A shows the actual waveform (under small-signal conditions resulting from low light levels) appearing at the output of amplifier 52, including voltages $e_Z$, $e_B$ and $e_R$, typical switching transients, damped oscillations and photosensor noise (or "cell noise").

At higher light levels, the gain in the amplifier 52 is automatically reduced, resulting in a waveform which more closely approaches the ideal of FIG. 5, with switching transients, damped oscillations and cell noise all diminishing.

Signal Conditioner Circuit

In order to provide a signal at all light levels having uniformly high quality for signal processing, the output of the amplifier 42 is direct-coupled into the SH device 56 (also referred to as a signal conditioner), which is designed to eliminate virtually all signal anomalies over the full dynamic range of the instrument.

The signal conditioner 56 is preferably an integrated circuit sample-and-hold device characterized by high input impedance, low internal noise, unity gain, low slump, low offset voltage, and excellent offset voltage temperature stability. The signal conditioner is keyed by MUX output channel 4 which is a symmetrical square wave preferably having twice the frequency of the reference drive (MUX output channel 2) and preferably advanced on the time scale by approximately 0.5. millisecond. See FIG. 4.

Figure 6B:
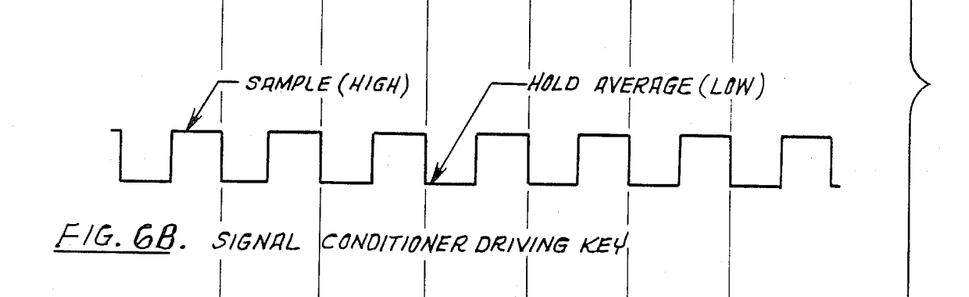
Figure 6C:
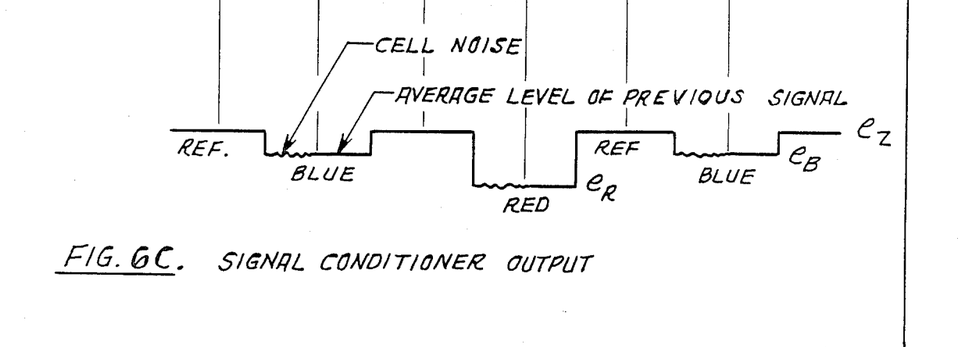

FIG. 6 is a set of waveforms including the signal conditioner input in FIG. 6A, the signal conditioner driving key (from MUX output 4) in FIG. 6B, and the resultant signal conditioner output in FIG. 6C. The output of the signal conditioner 56 follows the input during "sample" time (i.e. when the signal conditioner is being driven by the MUX system 12) but is constant during "hold" time, when it is fixed at a dc level substantially equal to the average of the signal (reference, "red," or "blue," respectively) that occurred during the previous sample time.

Signal averaging is accomplished by placing the resistor 58 in series with the memory capacitor 60 in the signal conditioner circuit 16. The RC time constant of resistor 58 and capacitor 60 is long enough to filter out the cell noise, which is mostly at relatively high frequencies, yet short enough to preserve a substantially rectangular wave shape at the signal conditioner output due to the relatively low MUX switching rate.

A sample driving key from MUX output channel 4—of the form shown in FIG. 6B—drives the signal conditioner 56, and the timing and pulse width of the sample key are such as to block the switching transients and damped oscillations, preventing them from appearing in the output of the signal conditioner 56. These unwanted components (which are non-symmetrical) are therefore also prevented from affecting the value of the averaged signal delivered during each hold interval. The cell noise components delivered at the output of signal conditioner 56 during the sample periods (approximately the first half of each red and blue interval) are of no consequence because, as will be shown, the signal values are preferably read out for transfer to other circuits in the present device only during approximately the second halves of the respective intervals, when relatively noise-free average values are present at the output of the signal conditioner 56.

The signal conditioner thus has as an output a tri-level signal of substantially the same form as its input, with voltages which are approximately equal to the voltages $e_B$, $e_Z$ and $e_R$, without the unwanted switching transients, oscillations and cell noise.

Coupling Network

The output of the signal conditioner 56 is coupled through the capacitor 61 to the "red" sample-and-hold device 62 of the AGC 18 and to amplifier 64 of the ratio computer 20. The primary purpose of capacitor 61 is to block passage of any accumulated dc offset voltage developed by amplifier 52 and signal conditioner 56, while allowing substantially unimpeded passage of the conditioned tri-level signal. This may be realized very accurately through the use of the switch 66 which, with capacitor 61, forms a synchronous bilateral analog ground clamp when switch 66 is driven by MUX output channel 5. Switch 66 is a bilateral analog switch preferably characterized by low ON resistance, extremely high OFF resistance and substantially zero offset voltage. As shown in FIG. 4, MUX output channel 5 drives switch 66 ON for a short time during each memorized average reference interval appearing at the output of the signal conditioner 56. This allows capacitor 61 to rapidly charge or discharge—through the low resistance of switch 66 and the low source impedance of signal conditioner 56—to whatever value of offset voltage is then appearing at the output of the signal conditioner 56. This action also clamps the reference level to zero (or ground) on the output side of capacitor 61; thus, MUX output channel 5 constitutes as a ground clamp drive. The resistance of switch 66 then swings high until the next reference interval; i.e., the value of the resistance through which capacitor 61 must discharge becomes that of the OFF resistance of switch 66, paralleled by the input resistances of the SH device 62 and the amplifier 64, which may amount to several thousand megohms for the selected devices. With a discharge resistance of such high magnitude, the charge on capacitor 61 is effectively trapped, and voltage is therefore maintained across capacitor 61, automatically nulling substantially all accumulated offset voltage until reset occurs during the next reference interval.

In addition, because the charge on capacitor 61 remains virtually unchanged between reset intervals, the full range of signal voltage variations subsequently occurring at the output of signal conditioner 56 is transferred to the output side of capacitor 61 with substantially all of the exponential time slump (which normally occurs when low frequency rectangular waveforms are coupled through conventional RC coupling networks) having been eliminated.

The output of the coupling network 17 is a tri-level signal with voltages $e_{ib}$, $e_{iz}$ and $e_{ir}$ which are substantially equal to the input voltages $e_B$, $e_Z$ and $e_R$, respectively, minus any offset voltage and exponential time slump which may have been eliminated by the coupling network.

Automatic Gain Controller System

One of the two circuits fed from the output side of capacitor 61 of the coupling network 17 is the AGC system 18 for amplifier 52. The AGC system 18 is used primarily to maintain high linearity in amplifier 52 over a wide range of currents resulting from a range of lamp intensities at the input and it acts as a keyed, delayed and amplified system of automatic gain control.

The keying action is accomplished through the SH device 62, which is an integrated sample-and-hold circuit identical to that used for the signal conditioner 56, except that the memory capacitor 68 is in a minimum time constant circuit which responds virtually instantaneously (and in any case substantially faster than the second sampling frequency), rather than averaging the input as is done in the signal conditioner circut. The SH device 62 is enabled by MUX output channel 6, which enablement, as shown in FIG. 4, occurs just after the start of the "average red hold" interval at the output of signal conditioner 56. (The reason for keying the AGC system 18 to the red signal component rather than applying the usual averaging technique to the entire waveform is explained below, and has a bearing on the operation of the blue-red ratio computer 20.) In effect, the SH device 62 reads the holds the red signal, thereby separating it from the time-multiplexed red and blue input. The output of the SH device 62 is at a steady dc level substantially equal to that of the averaged red level at the output of signal conditioner 56, but can change rapidly to follow any changes in the red signal component.

The output of second SH device 62 is direct-coupled to the input of the error amplifier 70, which is biased by the potentiometer 71 with an approximately −0.1 volt delay potential derived from a stable voltage reference which is obtained from the reference voltage supply 22. The error amplifier 70 is preferably an integrated circuit operational amplifier having a low temperature-stable offset, and is preferably configured as a medium-gain differential input damped integrating amplifier. The output of the amplifier 70 is a dc potential which controls the resistance value of the opto-coupler 54, and thereby also controls the conversion gain of amplifier 52. The opto-coupler 54 contains a light-dependent resistor (LDR) controlled by radiation from a light-emitting diode (LED). (The LDR and LED are not separately shown in the drawings.) The LDR is selected for a very low voltage coefficient of resistance and is operated at a low voltage differential (approximately 0.1 volts peak-to-peak) to endow amplifier 52 with excellent conversion linearity, preferably with less than approximately 0.1% total harmonic distortion (THD)).

Any red signal voltage with a peak-to-peak magnitude less than approximately the magnitude of the delay potential (i.e. 0.1 volt) will undergo maximum amplification through amplifier 52. When the magnitude of the red component exceeds approximately 0.1 volt, the differential value therebetween drives the damped integrating error amplifier 70, which preferably has a long integration time constant (such as approximately 0.1 second), and which develops an error-proportional dc control signal at its output. The control signal smoothly reduces the resistance of the LDR in the opto-coupler 54 by increasing the brightness of the LED, which decreases the gain and thereby stabilizes the red signal output of amplifier 52. Note that the long integration time constant of amplifier 70 averages the effects of any remaining noise by responding to the average level of several red cycle inputs. This also assures that the gain of amplifier 52 is the same for the time-interlaced blue component as it is for the red component. The loop gain of the AGC system 18 is preferably such that changes in test lamp luminous intensity of a ratio of approximately 2000:1 results in less than approximately 10% change in the red signal level at the output of the amplifier 52.

Ratio Computer

The ratio computer 20 computes the ratio of the blue and red components of the lamp radiation by computing the ratio of the voltages $e_{ib}$ and $e_{ir}$. The conditioned, clamped and regulated signal at the output side of the capacitor 61 feeds into the blue-red ratio computer 20 via the amplifier 64. The ratio computer 20 includes the amplifier 64, the SH device 72, error amplifier 74, and the SH device 76, which are preferably integrated circuits. There are several similarities between the blue-red ratio computer 20 and the AGC system 18, and the functional description of the computer 20 will be expedited through references to operational descriptions given for similar circuits in the AGC system 18. An explanation of how the ratio computer 20 derives the blue-red ratio is given, following the discussion of the circuit characteristics.

Amplifier 64, which has as its input the output of the coupling network 17, is an integrated operational amplifier configured as a non-inverting voltage-controlled variable gain amplifier. The gain is controlled by the opto-coupler 78, which may be identical to the opto-coupler 54. The stand-by voltage gain of amplifier 64 (i.e. the voltage gain when there is no input) is approximately 100. The minimum gain may approach unity, but typically runs at approximately 70 under dynamic conditions. Preferably the gain under dynamic conditions varies from 70 by not more than ±10%. Although the output signal is at a level of several volts, the peak-to-peak potential across the opto-coupler 78 is substantially equal to the input to the amplifier 64, namely approximately 0.1 volt, because of the position of the opto-coupler 78 in the feedback loop, which is comprised of the LDR component of opto-coupler 78 and feedback resistor 103. This assures excellent linearity, and as in the case of amplifier 52, the amplitude distortion is kept under approximately 0.1% THD. Moreover, because the signal levels across the opto-couplers 54 and 78 are substantially equal and because the opto-couplers 54 and 78 have reverse relative positions in their respective feedback loops, the small distortion components created by the amplifier 64 tend to oppose those created by the amplifier 52. This reduces the overall distortion to a very low level, particularly at higher input signal levels, where the optocouplers 54 and 78 have substantially equal operating points. This high degree of linearity is very helpful for accurately preserving the correct blue-red ratio over the full dynamic range of the instrument.

The output of the amplifier 64 is an amplified replica of the tri-level signal at its input, said output having voltages $e_{ob}$, $e_{oz}$ and $E_{or}$ (later shown to be essentially constant) which are substantially proportional to the input voltages $e_{ib}$, $e_{iz}$ and $e_{ir}$, respectively. This output signal is coupled into the SH devices 72 and 76 through a network which includes the capacitor 82 and the electronic analog switch 84, which operate in the manner described above relative to the capacitor 61 and the switch 66 to cancel amlifier offset and clamp the signal reference level to ground.

As described above relative to the signal conditioner circuit 16, during each "hold" time of MUX output channel 4, the output of the signal conditioner 56—and hence also the input of the amplifier 64—is fixed at a dc level substantially equal to the average of the previously sampled signal. As shown in FIG. 4, MUX output channel 6 is engaged during each "hold" period of MUX channel 4 which follows a sampling of the red signal, and thereby extracts the red signal $E_{or}$ from the amplifier 64 as input to the SH device 72. Thus, this red signal component $E_{or}$ is detected and held by the SH device 72, which comprises a rapidly responding sample-and-hold integrated circuit keyed by MUX output channel 6 and operates in conjunction with capacitor 85, which preferably is in a minimum time constant circuit which responds substantially faster than the sampling frequency of MUX channel 2.

The red signal voltage component $E_{or}$ output from the SH device 72 is then input to the error amplifier 74, in a manner analogous to the operation of the AGC system 18. The amplifier 74 operates in a manner analogous to the amplifier 70, except that its open loop dc gain is substantially higher, causing it to perform as a true damped integrating comparator, which yields very tight, smooth control over the gain of amplifier 64. Amplifier 74 controls the gain of amplifier 64 through the transistor network 80, which regulates the resistance of the LDR in the opto-coupler 78 by controlling the LED brightness. The transistor network 80 inverts the action of the opto-coupler 78, i.e. an increased output from amplifier 74 results in a reduced gain in amplifier 64. This occurs when the resistance of the LDR in the opto-coupler 78 rises, which calls for a reduction in the brightness of the LED in the opto-coupler.

A stable reference voltage for amplifier 74 is provided by the preferably seven-volt reference voltage supply 22, which preferably includes a sophisticated integrated circuit device that includes an oven and temperature regulator in addition to a constant current source for its buffered seven-volt zener reference diode. Thus, the magnitude of the reference voltage fed to the input of amplifier 74 is nominally approximately seven volts, so that the lamp analyzer maintains the level of the red component at the output of amplifier 64 at substantially this value (within approximately 0.001% of the reference voltage) over the full luminous intensity range of the instrument. This high degree of regulation is partially attributable to the pre-regulation of the red component accomplished by the AGC system 18, which explains why the AGC is keyed to the red signal component rather than using the average signal level for control.

The output of the blue-red ratio computer 20 is taken from SH device 76, which is chosen to have high input impedance, low offset voltage and excellent offset temperature stability. The SH device 76 is keyed by MUX output channel 7, which, as shown in FIG. 4, is engaged during a portion of each "hold" period of MUX channel 4 which follows a sampling of the blue signal, and is thus timed for extraction of the amplified blue signal component $e_{ob}$.

The memory capacitor 86 associated with the SH device 76 is connected in series with the resistor 88 to form a long-time-constant filter. The output of SH device 76, then, represents the average for a number of blue component cycles. As with the red component signal, this is done to suppress any remaining random noise from the output. In addition, the filtering action suppresses 60 Hz noise and harmonics thereof which may have been inadvertently introduced from the power line, and suppresses other unwanted components generated by interaction between the MUX switching signal and extraneous power line cyclical signals. This action is assured by operating the MUX system 12 at a frequency which is asynchronous with the power line 60 Hz frequency and its harmonics, such as at 95 Hz, thus preventing dc rectification components from appearing in the amplifier outputs. Rectification components cannot be eliminated by filtration, and constitute dc error terms which cannot be eliminated later through calibration, because they would vary with gain changes caused by action of the AGC system 18.

To complete an understanding of the blue-red ratio computer 20, all that remains is to show that the blue signal amplitude, which is the output of the ratio computer 20, is indeed substantially proportional to the blue-red ratio when the described computer circuit properties are realized.

The voltage gain of the amplifier 64 may be expressed as the ratio of the output signal voltage to the input signal voltage. The red and blue input signals are variables, as is the gain of amplifier 64, said gain being automatically adjusted to precisely regulate the red output signal to a constant value, such as seven volts. In terms of the red signal components, the gain of amplifier 64 can be expressed as:

$$a = \frac{E_{or}}{e_{ir}} \quad (1)$$

Where: $E_{or}$ is the substantially constant red signal output voltage, $e_{ir}$ is a variable red signal input voltage, and $a$ is the gain of amplifier 64 for any particular value of $e_{ir}$.

Amplifier 64 constitutes a linear amplifier. Under steady state conditions, its automatically selected gain is substantially the same during the red and blue intervals. For any particular red input that is sufficiently great to provide a regulated red output, the corresponding blue output is given by:

$$e_{ob} = ae_{ib} \quad (2)$$

Where: $e_{ob}$ is the blue signal output voltage from amplifier 64, $a$ is the gain of amplifier 64 for a particular red signal input voltage, and $e_{ib}$ is the corresponding blue signal input voltage to amplifier 64.

Substituting the right-hand member of equation (1) into equation (2), we have:

$$e_{ob} = \frac{E_{or}}{e_{ir}} e_{ib} \quad (3)$$

$E_{or}$ is regulated by the ratio computer 20 to a substantially constant value of 7 volts provided by the reference voltage supply 22. Substituting for $E_{or}$ and rearranging equation (3), we have:

$$e_{ob} = 7 \frac{e_{ib}}{e_{ir}} \quad (4)$$

Equation (4) verifies that $e_{ob}$, which is the output from the blue-red ratio computer 20, is substantially proportional to the ratio of the blue and red signal components appearing at the input to the computer 20. In effect, the ratio is computed and multiplied by a factor of approximately seven, which is the magnitude of the stable reference voltage.

In order to take full advantage of the available dynamic range of the ratio computer 20 and to optimize the blue channel signal-to-noise ratio, the red band pass filter 38 preferably includes a neutral density attenuator 39 which causes the blue component, as perceived by the photosensors, to exceed the red component by a factor of 1.43 at 3200 Kelvins. Thus the output of the ratio computer 20 is 7 times approximately 1.43, or approximately 10 volts at 3200 K. The fact that the blue component electronically exceeds the red component at higher temperature levels has no adverse effect upon operation of the system, because both the AGC system 18 and ratio computer 20 are keyed to the red component, causing the control circuitry to completely ignore the presence of the blue signal regardless of its amplitude. The blue signal derived from an incandescent lamp can not exceed the linear dynamic range of the system (approximately 13.5 volts peak which corresponds to a color temperature of 4320 K.) because the tungsten filament would melt before this level had been reached.

Translator and Kelvin Meter

The output of the ratio computer 20 drives the digital panel meter 90 through the translating circuitry 92. The circuitry 92 includes all calibration adjustments as well as the operational circuitry that converts the ratio signal input to an output which causes the display meter to indicate the corresponding Kelvin temperature.

The meter 90 is a high quality digital voltmeter, having a four-digit display, an automatic zero feature and a full-scale sensitivity of 9.999 volts. The selected scale factor in the present invention is 1 mv per Kelvin, so that the voltmeter reads directly in Kelvins when the meter readout is multiplied by one thousand. This is readily accomplished by simply extinguishing the display decimal point, which converts the meter 90 to a millivoltmeter. The output of the meter 90 represents the calculated color temperature of the lamp 26.

Figure 7:
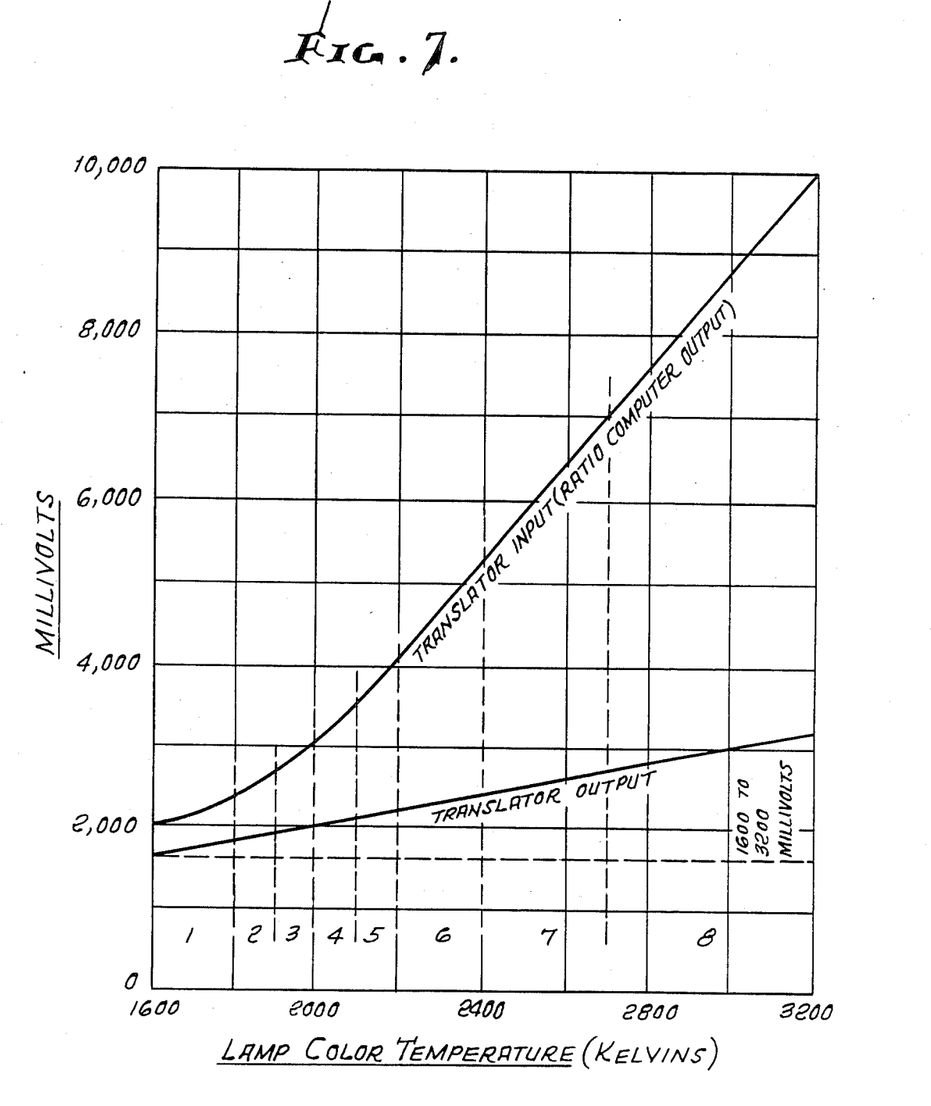
FIG. 7 are graphic plots of the ratio computer output, and of the resultant linearized output of the translator, for a NBS color temperature standard used for calibration of the system of the present invention, which output is obtained using a set of production blue and red optical glass filters which differ considerably from their CIE counterparts.

The translating circuitry 92 linearizes the curve shown in FIG. 7 (which is output from the ratio computer 20) over the range of color temperature values, by breaking down the curve into eight segments of various lengths so that each is a substantially linear section of the curve. See FIG. 7, top curve, which represents the output of the ratio computer with production red and blue filters (not CIE) when the system is excited by luminous flux from an NBS color temperature standard lamp.

The slope and vertical position of each segment are then independently adjusted by calibration controls so as to translate the non-linear input from the ratio computer 20 to a linear output of 1 mv per Kelvin, which is required to achieve an accurate presentation on the panel meter 90. The conversion that is accomplished by the translator is represented graphically in the lower curve of FIG. 7.

The translating circuitry 92 includes two major sections, shown in block form in FIG. 3. The first section is a bank of preferably eight (for optimum linearity) high stability, fractional gain, operational amplifiers, which have individual slope (gain) and vertical positioning (offset) adjustments. The eight amplifiers are driven in parallel by a signal "a", which is substantially equal to $e_{ob}$, the output from the ratio computer 20. The second section is a window comparator with a number of segments equal to the number of operational amplifiers, which selects and couples the output of the appropriate operational amplifier to the Kelvin meter 90. The window comparator is driven by a signal "b", using a reference input "c" as a stable reference. Signal "b" is output from the amplifier 94, and is substantially proportional to the inverse of the blue-red ratio; thus, the amplifier 94 scales and inverts the output of the ratio computer 20 in order to drive the window comparator. Input "c" is a positive voltage substantially equal to the seven-volt stable reference voltage, and is obtained from the amplifier 96, which has an input provided by the reference voltage supply 22. Reference input "c" is scaled by precision potentiometers to set the "trip" point for each window in the comparator. This allows window positions and widths to be adjusted to achieve maximum conversion linearity in the translator.

The bank of operational amplifiers includes a calibration switch which is used during calibration to temporarily remove the offset bias supply "e" and insert a reverse polarity nulling potential "d", the latter being used during calibration to zero each amplifier output at the bottom edge of its respective window. This allows the window width to be directly read on the panel meter (eliminating the need to subtract readings) and removes all interaction between the slope and offset calibration adjustments, thus allowing for non-iterative calibration. The calibration is also expedited by eight LED lamps, which provide a visual indication that the desired channel has been activated.

Error Detector

The error detector 25 disables the Kelvin meter 90 display if either the color temperature or luminous intensity is outside the range of accurate measurement. If sufficient light is produced by the test lamp 26 to activate the AGC system 18 and lock the ratio computer 20, but the color temperature is below the lower calibration limit (1600 K.), the translator window comparator of the translating circuitry 92 is not activated, and the Kelvin panel meter 90 displays only zeros. However, a low intensity light, insufficient to activate the AGC system 18 and ratio computer 20 circuitry but having a high color temperature, could nonetheless activate the window comparator and cause the meter to display an erroneous color temperature. This is prevented by the error detector 25, which includes the transistor switch 98 and the not-and (NAND) gate 100.

Switch 98 is normally ON, placing a ground on a strobe line 102 of the amplifier 94, which prevents amplifier 94 from delivering an output when the not-and gate 100 is unactivated. This blocks activation of the translator window comparator, thereby establishing a zero read-out on the Kelvin meter 90.

The gate 100 has as inputs the outputs of the error amplifier 70 and the error amplifier 74, which outputs swing from small negative values to above approximately one volt (positive) when a sufficient signal exists to properly activate the AGC system 18 and lock the ratio computer 20.

If both amplifiers 70 and 74 deliver high inputs to the gate 100, i.e. greater than approximately one volt, the gate's output swings from zero to a negative value which biases switch 98 to cut-off. This action releases the amplifier 94, allowing it to drive the translator window comparator. The window comparator then selects the appropriate translator calibration amplifier coupling its output to the Kelvin meter for an accurate display of the lamp color temperature.

In operation, radiation from the lamp 26 is reflected by the inner surface 32 of the photometric sphere 30, and passes through the red filter 38 and blue filter 40 to the photosensors 34 and 36, respectively. The photosensors 34 and 36 produce "red" current $i_R$ and "blue" current $i_B$, respectively, which are electrical analogs of red and blue lamp radiation components passed by the filters 38 and 40. The currents $i_R$ and $i_B$ are multiplexed with the zero reference current $i_Z$ obtained through resistor 50, as described above with respect to the current-to-voltage converter 14, and are provided as input to the amplifier 52, producing a tri-level signal substantially as shown in FIG. 6A, with voltage levels $e_R$, $e_Z$ and $e_B$ which are related to the input currents $i_R$, $i_Z$ and $i_B$, respectively.

The tri-level waveform obtained from the amplifier 52 is input to the blue-red ratio computer 20, which computes the ratio of the blue and red components of the lamp radiation. As described above, this is done preferably by amplifying the red component of the tri-level signal to a substantially constant output by means of the amplifier 64 with a variable gain, and then by applying the gain utilized to produce the constant "red" output voltage to the "blue" component of the tri-level signal, thereby producing an output which is substantially proportional to the ratio of the blue component to the red component.

Finally, the color temperature of the lamp corresponding to the output of the translator 24 is displayed on the meter 90.

The tri-level signal obtained from the current-to-voltage converter 14 is preferably conditioned by the signal conditioner circuit 16 before being input to the blue-red ratio computer 20, in order to remove switching transients and damped oscillations introduced at the photosensors or during the multiplexing operation of $i_Z$ and $i_B$. This is accomplished, as described above with respect to the signal conditioner circuit 16, by sampling the tri-level signal at times when the signal is substantially constant, and by blocking the input to the signal conditioner 56 when the tri-level signal exhibits switching transients and damped oscillations.

The signal conditioner circuit 16 preferably also filters out cell noise by means of the resistor 58 and the capacitor 60, which have an RC time constant which is long enough to filter out cell noise, and short enough to preserve the substantially rectangular shape of the tri-level signal. The signal conditioner thus has as its output a tri-level signal with voltages $e_R$, $e_Z$ and $e_B$ substantially unaltered, other than by removing the switching transients, damped oscillations and cell noise.

The output of the signal conditioner 56 preferably passes through the coupling network 17 for preventing the passage of substantially all accumulated dc offset voltage which may have developed during current-to-voltage conversion or signal conditioning, but allowing substantially unimpeded passage of the tri-level signal. This is accomplished by clamping the tri-level signal to ground via the capacitor 61 during each "red" and "blue" reference interval provided by MUX output channels 1 and 3, respectively, and by clamping the reference level to zero, thereby nulling substantially all amplifier offset voltage, and preventing substantially all exponential time slump which tends to be introduced.

The tri-level signal as output from the coupling network 17 is preferably input to the AGC system 18, in order to maintain high linearity in the amplifier 52 regardless of the luminous intensity of the lamp 26. This is accomplished by reducing the gain of the first amplifier 52 whenever the magnitude of the red component exceeds the magnitude of the delay potential obtained from the potentiometer 71. The tri-level signal, which has now preferably been (a) conditioned by the signal conditioner 16, (b) clamped to ground by the coupling network 17, and (c) regulated by the AGC system 18, is then provided as an input to the blue-red ratio computer 20.

The output of the ratio computer 20 is preferably linearized by the translating circuitry 92, as described above. Finally, if either the color temperature or luminous intensity input to the Kelvin meter 90 is outside the range of accurate measurement, the error detector 25 is preferably utilized to deactivate the meter 90.

Various modifications of the foregoing embodiment may be made without departing from the spirit and scope of the invention.

I claim:

1. In a system for analyzing the color temperature of an incandescent lamp which provides radiation in the visible spectrum and having blue and red components, the combination of:

an input section for generating electrical analogs of the blue and red components of lamp radiation, in the form of first and second currents, respectively, said input section including a first photosensor unit and a second photosensor unit for receiving lamp radiation and providing said first and second currents, respectively, a zero ground reference, and a first resistor connected to said zero ground reference for providing a third current as a reference current;

a multiplex system for multiplexing said first, second and third currents in time sequence;

a current-to-voltage converter for producing first, second and third voltages substantially proportional to said first, second and third currents, respectively, with said third voltage being a constant reference voltage, said current-to-voltage converter including a first amplifier having said multiplexed currents as an input;

a ratio computer having said first, second and third voltages as inputs, for computing the ratio of said first and second voltages, said ratio computer including sample-and-hold means controlled by said multiplex system for sampling said first and second voltages in sequence with said third voltage providing a reference; and a display means for displaying color temperature as a function of said ratio, and including a meter and translating circuitry connecting said ratio computer output to said meter for translating said ratio computer output to the color temperature of the lamp;

said translating circuitry including:

a plurality of operational amplifiers, each having gain and offset adjustments;

a window comparator with a corresponding plurality of segments for selecting an operational amplifier for connection to said meter, each of said window comparator segments having a trip point;

first means for connecting the ratio computer output as an input to each of said operational amplifiers in parallel; and second means for connecting the ratio computer output and a reference voltage to said window comparator in controlling relation for selecting an operational amplifier output for connection to said meter.

2. The system of claim 1, wherein:

said input section includes a lamp holder, a light integrating photometric sphere, a red optical band pass filter, a blue optical band pass filter, with said filters positioned between said lamp holder and said first and second photosensor units, respectively, a first electronic analog switch, a second electronic analog switch, and a third electronic analog switch;

said multiplex system includes a first output channel, a second output channel, a third output channel, with said first, second and third output channels controlling said first, second and third analog switches, respectively, a fourth output channel, a fifth output channel, a sixth output channel, and a seventh output channel; and said ratio computer includes a second amplifier, a first sample-and-hold device, a third amplifier, a second sample-and-hold device, and a fourth electronic analog switch, with the output of said second amplifier connected as input to each of said first and second sample-and-hold devices by said fourth switch and with said fourth switch controlled by said multiplex system fifth output channel.

3. The system of claim 2, including:
an automatic gain controller system for maintaining linearity in said current-to-voltage converter over a wide range of currents resulting from a range of lamp intensities; and
a reference voltage supply for providing a reference voltage to said automatic gain controller system;
said automatic gain controller including
a third sample-and-hold device having the output of converter connected as input and controlled by said multiplex system sixth output channel, and
a fourth amplifier having the output of said third device and said reference voltage as inputs and providing an output to a feedback circuit of said current-to-voltage converter first amplifier.

4. The system of claim 3, including a signal conditioner circuit connected between said converter and said ratio computer and automatic gain controller, and including a fourth sample-and-hold device, and a memory circuit comprising a resistor, and a capacitor.

5. The system of claim 4, wherein:
said input section includes a baffle and a heat sink;
said red optical band pass filter is disposed between said sphere and said first photosensor unit;
said blue optical band pass filter is disposed between said sphere and said second photosensor unit;
said baffle is disposed between said lamp and said red and blue optical band pass filters; and
said heat sink is in thermal communication with said first and second photosensor units.

6. The system of claim 5, wherein:
said first output channel controls said first switch and has a first frequency sampling frequency and first sampling period;
said second output channel controls said second switch and has a second frequency sampling frequency twice said first sampling frequency and second and fourth sampling periods;
said third output channel controls said third switch and has said first frequency sampling frequency and a third sampling period;
said fourth output channel controls said fourth sample-and-hold device and has a third frequency sampling frequency twice the frequency of said second sampling frequency and leading approximately 0.5 millisecond out of phase therewith;
said fifth output channel controls said fourth switch;
said sixth output channel controls said first sample-and-hold device and said third sample-and-hold device; and
said seventh output channel controls said second sample-and-hold device.

7. The system of claim 6, wherein:
said first photosensor unit has a dark-cell resistance of at least approximately 10 megohms, and has as its output said first current which is an electrical analog of radiation from said lamp which passes through said red optical band pass filter;
said second photosensor unit has a dark-cell resistance of at least 10 megohms, and has as its output said second current which is an electrical analog of radiation from said lamp which passes through said blue optical band pass filter; and said third current is in communication with said zero ground reference, and said first resistor and said second switch are connected in series to said input of said first amplifier.

8. The system of claim 7, wherein:
said third current is provided as an input to said first amplifier after each input of said first current to said first amplifier and after each input of said second current to said first amplifier;
said first current is provided as an input to said first amplifier after each input of said third current to said first amplifier which is preceded by an input of said second current to said first amplifier; and
said second current is provided as an input to said first amplifier after each input of said third current to said first amplifier which is preceded by an input of said first current to said first amplifier.

9. The system of claim 8, wherein:
said third sample-and-hold device has as inputs said first, second and third voltages;
said output of said first amplifier is provided as an input to said third sample-and-hold device only during approximately the second half of each first sampling period associated with said first sampling frequency, during approximately the second half of each second and fourth sampling periods associated with said second frequency, and during approximately the second half of each third sampling period associated with said first sampling frequency;
said third sample-and-hold device has as outputs a fourth voltage approximately equal to said first voltage averaged over said first sampling period, a fifth voltage approximately equal to said second voltage averaged over said third sampling period, and a sixth voltage approximately equal to said third voltage averaged over said second sampling period;
said third resistor and fourth capacitor are connected in series to said third sample-and-hold device; and
an RC time constant associated with said third resistor and fourth capacitor is substantially longer than said first, second, third our fourth sampling periods.

10. The system of claim 1, including:
a calibration switch for switching said operational amplifiers between an operate mode and a calibrate mode;
bias means for supplying an offset bias to each of said operational amplifiers; and
null means for supplying a null voltage to each of said operational amplifiers;
with said calibration switch connecting said bias means when in said operate mode and connecting said null means when in said calibrate mode.

11. A method for determining the equivalent blackbody color temperature of an incandescent lamp having radiation in the visible spectrum with blue and red components, including the steps of:
detecting the blue component of radiation from the lamp;
detecting the red component of radiation from the lamp;
producing a first current as an electrical analog of said blue component;
producing a second current as an electrical analog of said red component;
providing a reference current;

multiplexing said zero reference current with said first current and said second current;

converting said first current to a first voltage and said second current to a second voltage and said reference current to a reference voltage in sequence producing a tri-level signal with voltage levels related to the first current, second current and reference current, respectively;

computing the ratio of said first voltage to said second voltage to provide a ratio signal;

linearizing said ratio before displaying the blackbody color temperature of the lamp, including separating the ratio signal into a plurality of signal segments corresponding to lamp color temperature segments, separately amplifying said signal segments, with a predetermined gain and zero offset for each amplification, and selecting one of said signal segments for display as a function of the amplitude of said ratio signal; and displaying the equivalent blackbody color temperature of the lamp as a function of said ratio signal.

* * * * *